United States Patent [19]
Koitabashi

[11] Patent Number: 4,624,354
[45] Date of Patent: Nov. 25, 1986

[54] ELECTROMAGNETIC CLUTCH

[75] Inventor: Takatoshi Koitabashi, Annaka, Japan

[73] Assignee: Sanden Corporation, Gunma, Japan

[21] Appl. No.: 306,660

[22] Filed: Sep. 29, 1981

[30] Foreign Application Priority Data

Nov. 10, 1980 [JP] Japan .......................... 55-161093[U]
Dec. 27, 1980 [JP] Japan .......................... 55-187841[U]

[51] Int. Cl.$^4$ .......................... F16D 3/12; F16D 3/76; F16D 27/10; F16D 27/14
[52] U.S. Cl. .............................. 192/84 C; 192/30 V; 192/106.1; 464/75; 464/89
[58] Field of Search .............. 192/84 C, 113 A, 106.1, 192/30 V; 464/17, 74, 75, 89

[56] References Cited

U.S. PATENT DOCUMENTS

| | | | |
|---|---|---|---|
| 1,674,225 | 6/1928 | Reed | 192/106.1 |
| 1,719,624 | 7/1929 | Reed | 192/106.1 |
| 1,721,504 | 7/1929 | Reed | 192/106.1 |
| 1,825,981 | 10/1931 | Reed | 192/113 A X |
| 1,906,057 | 4/1933 | Guy | 464/89 |
| 1,954,190 | 4/1934 | Zeder | 464/89 X |
| 3,044,594 | 7/1962 | Bernard | 192/84 |
| 3,082,933 | 3/1963 | Bernard | 230/15 |
| 3,205,989 | 9/1965 | Mantey | 192/84 |
| 3,325,760 | 6/1967 | Bernard | 192/84 C X |
| 3,384,213 | 5/1968 | Bernard et al. | 192/84 C |
| 3,425,529 | 2/1969 | Hayashi | 192/84 |
| 3,455,421 | 7/1969 | Miller | 192/84 |
| 3,565,223 | 2/1971 | Pierce | 192/106.1 X |
| 3,774,739 | 11/1973 | Higuchi | 192/84 C |
| 4,150,738 | 4/1979 | Sayo et al. | 192/84 C |

FOREIGN PATENT DOCUMENTS

| | | | |
|---|---|---|---|
| 2733880 | 2/1978 | Fed. Rep. of Germany | 192/106.1 |
| 0123028 | 9/1980 | Japan | 192/84 C |
| 0709115 | 5/1954 | United Kingdom | 192/106.1 |
| 0714644 | 9/1954 | United Kingdom | 192/106.1 |

Primary Examiner—Rodney H. Bonck
Attorney, Agent, or Firm—Banner, Birch, McKie & Beckett

[57] ABSTRACT

An electromagnetic clutch is disclosed. The electromagnetic clutch includes a pulley and an electromagnetic mechanism. A hub is secured on a drive shaft and has a radially extending flange portion. An armature plate is concentrically disposed on the hub and faces the axial end surface of the pulley with an axial air gap. A holder plate is fixed on an axial end surface of the armature plate and is formed with an axially extending flange which has a configuration including at least one straight line. The radial flange portion of the hub is also formed with a second axially extending flange at a radial outer end portion. The first and second axially extending flanges are formed of a similar configuration and face one another with a radial gap between them. An elastic member is disposed in an inner surface of the first axial flange portion to fill the radial gap and cover the axial end surface of the radial flange portion and the second axial flange. Therefore, the hub and the armature plate are connected by the elastic member, and the impact force generated, when the electromagnetic clutch is activated, is eased by the compressive deformation of the elastic member.

18 Claims, 9 Drawing Figures

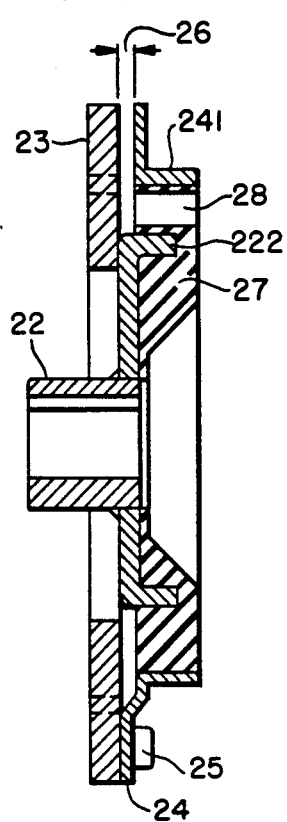
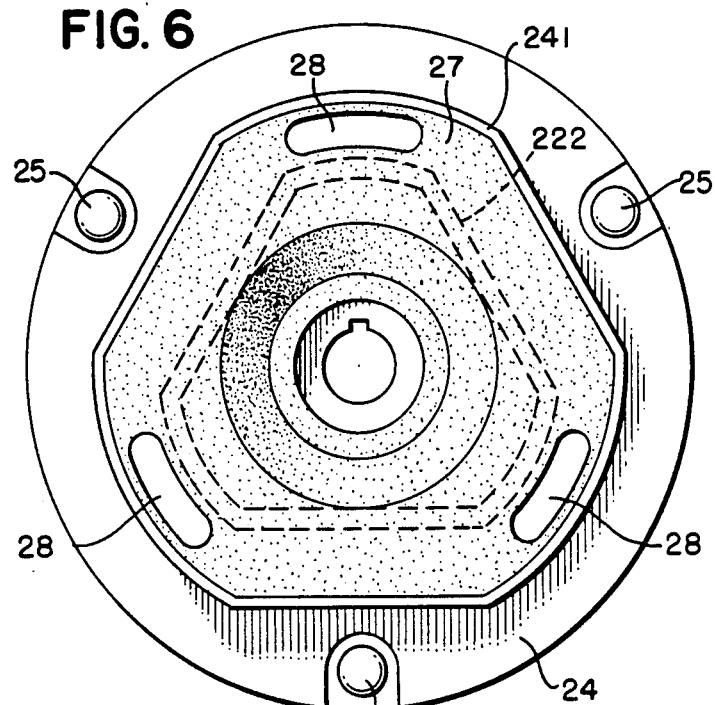
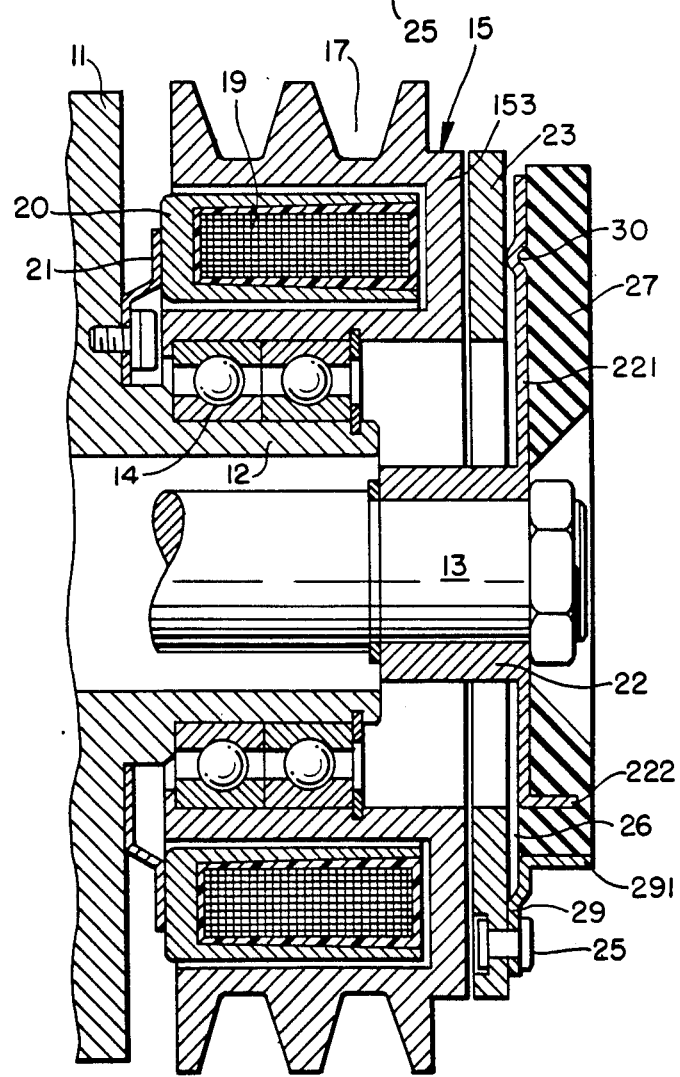

ELECTROMAGNETIC CLUTCH

BACKGROUND OF THE INVENTION

This invention relates generally to electromagnetic clutches, such as for use in controlling the transmission of power from an automobile engine to a refrigerant compressor in an automobile air conditioning refrigerating system, and in particular, to an improved connecting structure between an armature plate and a hub for transfering the rotation of a pulley to a shaft of the compressor.

The general structure of the electromagnetic clutch for use between the automobile engine and the compressor is disclosed in U.S. Pat. Nos. 3,044,594 and 3,082,933. The electromagnetic clutch disclosed in these patents comprises a pulley 1 rotatably supported on a tubular extension of a compressor housing through a bearing 2, as shown in FIG. 1. The pulley is rotated by a belt from the automobile engine. The pulley 1 is provided with a magnetic material in which one or more concentric arcuate or annular slits 3 are formed to define a plurality of concentric annular magnetic pole pieces. A drive shaft 4 of the compressor extends through the tubular extension. A hub 5 is fixed to the terminal end of the drive shaft 4. An annular armature plate 6 is joined by a plurality of leaf springs 7 to the hub 5 in such fashion that the armature plate 6 faces the annular concentric pole pieces with an axial air gap therebetween. A magnetic coil 8 is mounted on the tubular extension to supply magnetic flux for attraction of the armature plate 6 to the magnetic pole pieces.

Thus, when the magnetic coil 8 is energized, the drive shaft 4 is rotated together with the pulley 1 by the engine output, and when the magnetic coil 8 is not energized, the pulley 1 is rotated by the engine output but the compressor is not driven.

In this construction, the armature plate 6 is joined by a plurality of leaf springs 7 to hub 5 which is fixed to drive shaft 4. Therefore, if the armature plate 6 is attracted to the pulley 1 by the magnetic flux, it impacts against the pulley 1, and an impact sound is caused, because the two parts are formed of metal. This impact sound is very annoying to passengers within the automobile.

Moreover, as the compressor is driven, the noise caused within the compressor is transferred through the drive shaft 4 to a stop plate which is part of a magnetic clutch and would be diffused external of the compressor unit by the stop plate.

Furthermore, the impact force occurs at the moment when the armature plate connects the axial end surface of the pulley and begins to suddenly transmit the rotational force. The impact force is a result of the axial motion of the armature plate which places it in contact with the pulley and of the sudden initiation of rotational movement of the armature plate because of its coupling to the rotating pulley. However, this impact force is not cushioned by the rigid connection of the leaf springs between the armature plate and the drive shaft. The sudden torque change is thus transmitted to the drive shaft of the compressor. The leaf springs are disposed to an angular offset to be drawn or pulled generally along their lengthwise dimension in the direction of the rotation. Therefore, if the clutch is rotated in a direction opposite to the normal direction of rotation, shearing stress is caused in the leaf spring. The endurance of the clutch is therefore reduced.

In order to avoid these disadvantages, a holder plate 9 is fixed on the axial end surface of the armature plate 6 at an opposite side of the armature plate 6 than that which faces the pulley 1 by a plurality of rivets, as shown in FIG. 2. An inner end portion of the holder plate 9 and outer end portion of the hub 5 are formed with concentric annular axial flanges 91 and 51, and a rubber member 10 is disposed in the clearance between the axial flanges 91 and 51. Therefore, armature plate 6 is connected to hub 5 through holder plate 9 and rubber member 10. The transmission of sudden torque changes to the drive shaft is thus eased by the rubber member. However, easing of the impact force is dependent on inducing of bending stress and/or shearing stress in the rubber member. Therefore, the rubber member fatigues by the repeated intermittent operation of the clutch and the rubber member becomes cracked or is destroyed.

SUMMARY OF THE INVENTION

It is a primary object of this invention to provide an electromagnetic clutch which has a mechanism for easing the impact force transmitted to the drive shaft.

It is another object of this invention to provide an electromagnetic clutch with improved durability of the elastic member which connects the drive shaft to the clutch for transmitting the rotation.

It is still another object of this invention to provide an electromagnetic clutch which can be rotated in both directions.

An electromagnetic clutch according to this invention, includes a first rotatable member with an axial end plate of magnetic material, and a second rotatable member secured on a hub. The hub includes a radially extending flange portion. An annular armature plate is concentrically disposed on and radially outward of the hub with a radial gap defined therebetween. The armature plate faces the axial end plate of the first rotatable member with an axial air gap therebetween. An electromagnetic means is disposed within the first rotatable member for attracting the armature plate to the axial end plate of the first rotatable member. A holder plate is fixed on an axial end surface of the armature plate and is formed with a first axially extending flange portion which has a configuration which includes at least one straight line. The radial flange portion of the hub has a second axially extending flange portion. The first and second axial flanges are formed in analogus configurations and face one another with a gap between them. An elastic member is disposed on an inner peripheral surface of the first axial flange portion for filling the gap. The elastic member covers the axial end surface of the radial flange portion and the second axial flange portion. Therefore, the impact force is eased by the principally compressive deformation of the elastic member which is enclosed within the straight lines of both axial flanges. Excessive twisting deformation of the elastic member is thus prevented.

Further objects, features and other aspects of this invention will be understood from the following detailed description of the preferred embodiments of this invention referring to the annexed drawings.

BRIEF DESCRIPTION OF THE DRAWINGS

FIG. 5 is a vertical sectional view of a modification of the embodiment of FIG. 3;

FIG. 6 is a front view of the electromagnetic clutch shown in FIG. 5;

FIG. 7 is a vertical sectional view of an electromagnetic clutch according to another embodiment of this invention;

DETAILED DESCRIPTION OF THE PREFERRED EMBODIMENTS

Figure 1:
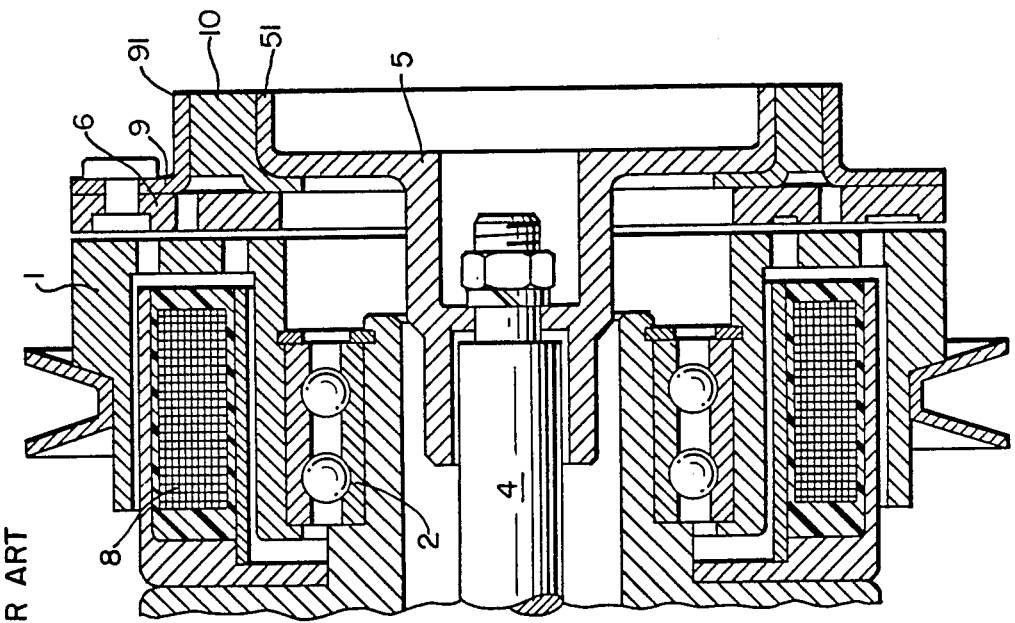
FIG. 1 is a vertical sectional view of a known electromagnetic clutch.
Figure 2:
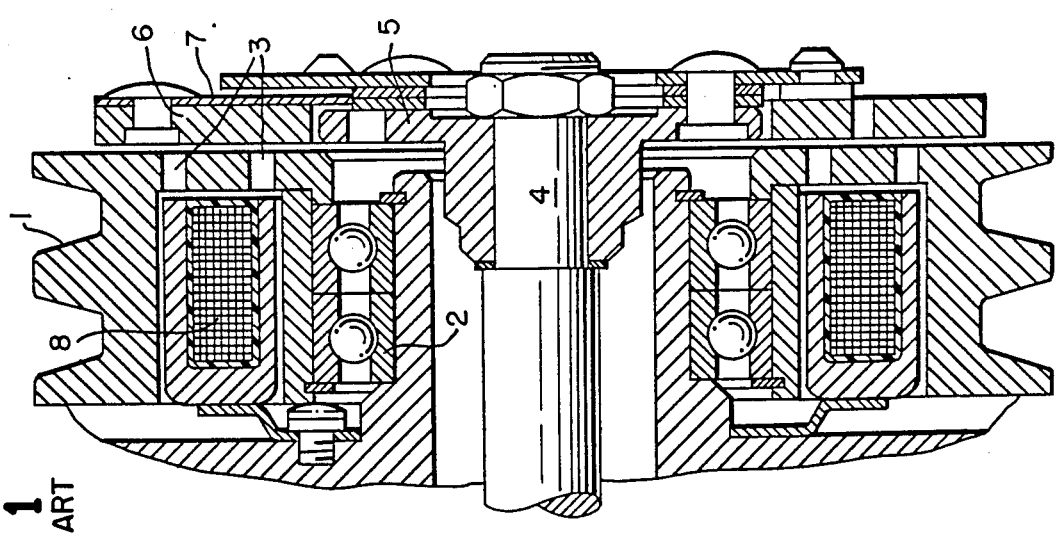
FIG. 2 is a vertical sectional view of another known electromagnetic clutch.
Figure 4:
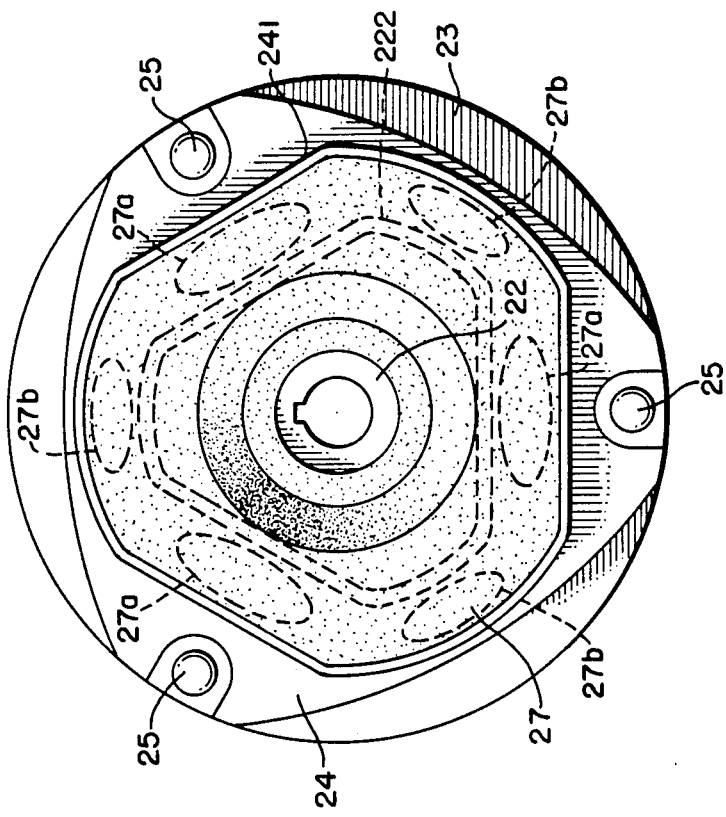
FIG. 4 is a front view of the electromagnetic clutch shown in FIG. 3.
Figure 3:
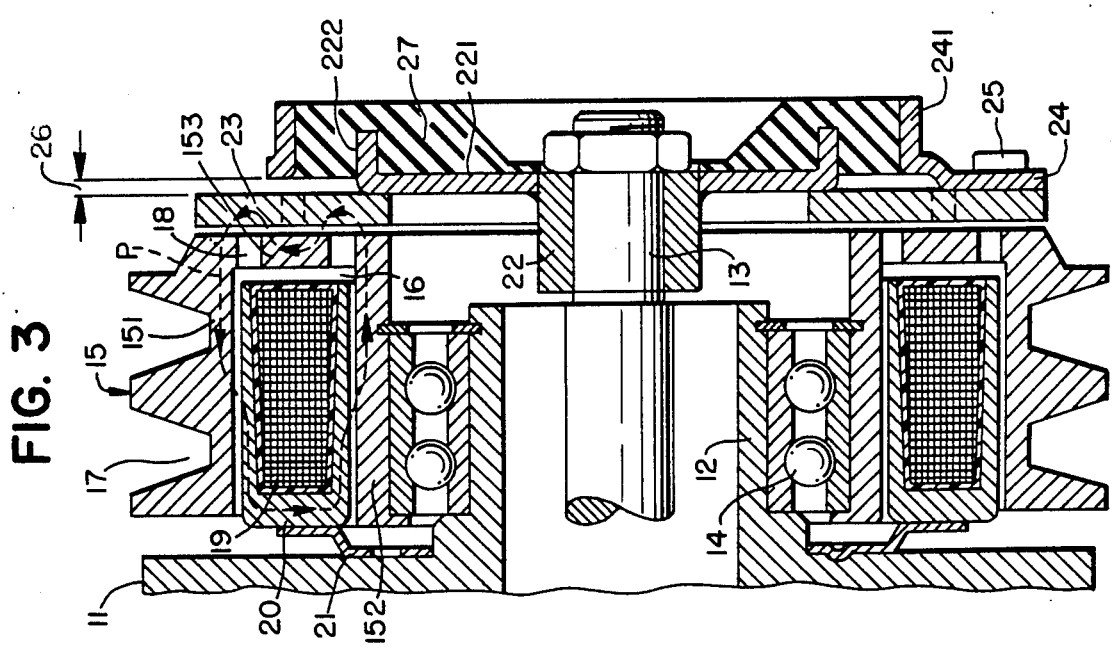
FIG. 3 is a vertical sectional view of an electromagnetic clutch according to one embodiment of this invention.

Referring to FIGS. 3-5 which illustrate an electromagnetic clutch according to an embodiment of this invention, a clutch is shown assembled on a refrigerant compressor for an automobile air conditioner. A compressor housing 11 is provided with a cantilevered tubular extension 12 surrounding an extension of a drive shaft 13 of the compressor. Drive shaft 13 is rotatably supported in the compressor housing 11 by bearings.

A pulley 15 is rotatably supported on tubular extension 12 through a bearing 14 which is mounted on the outer surface of tubular extension 12. Pulley 15 is made of magnetic material, such as steel, and comprises an outer annular cylindrical portion 151, an inner annular cylindrical portion 152 and an axial end plate portion 153 connecting the outer and inner cylindrical portions 151, 152 at an axial forward end. An annular U-shaped cavity 16 is defined between the portions 151, 152 and 153. A pair of annular V-shaped grooves 17 are provided on the outer peripheral surface of outer cylindrical portion 151 of pulley 15 for receiving a V-belt for coupling the compressor to the output shaft of the automobile engine (not shown). A single groove in the pulley could be used in other embodiments.

The axial end plate portion 153 includes one or more concentric slits 18 which are disposed on one or more concentric circles, so that a plurality of annular or arcuate magnetic pieces are defined, with the pole pieces surface being on the axial end surface of the axial end plate portion 153.

An electromagnetic coil 19 is disposed in annular cavity 16 of pulley 15. The coil 19 is contained within an annular magnetic housing 20 having a U-shaped cross section. Housing 20 is fixed to a supporting plate 21, which is secured to compressor housing 11, at its axial end surface. Coil housing 20 is thus maintained within cavity 16 out of contact with pulley 15 because of a small gap.

Drive shaft 13 of the compressor has a hub 22, which is secured to an extending terminal end of shaft 13. The hub 22 has a radial flange portion 221 extending radially outward. A ring plate or armature plate 23 is disposed concentric with hub 22 with an annular radial gap therebetween. The armature plate 23 faces the axial end plate portion 153 of pulley 15 with an axial air gap therebetween.

When coil 19 is not energized, only pulley 15 is driven by the engine of the automobile through the V-belt. On the other hand, when coil 19 is energized, magnetic flux (P) is induced and flows as indicated by the broken arrow line shown in FIG. 3, through a closed loop comprising coil housing 20, pulley 15, armature plate 23, pulley 15 and coil housing 20. As a result, the armature plate 23 is magnetically attracted to pulley 15 and rotates together with pulley 15.

In this construction, a holder pulley 24 is fixed to the axial end surface of armature plate 23 at an opposite side thereof than that which faces the axial end plate portion 153 of pulley 15 by a plurality of rivets 25. Holder plate 24 is formed with a first axial flange 241 which extends axially outward at the inner end portion thereof. The first axial flange 241 is formed in a generally triangular shape, as shown in Fig. 4, such that each corner of the triangle defines an arc, the center of which is placed at the center portion of the triangle. The configuration of axial flange 241 is thus comprised of a plurality of lines and arcs. An axial gap 26 is made between the axial end surface of armature plate 23 and the axial end portion of first axial flange 241, as shown in FIG. 3.

The radial flange portion 221 of hub 22 is formed with a second axial flange 222 which extends axially outward at outer radial end portion thereof. The first and second axial flanges 241 and 222 are formed in analogous configurations and face one another with a gap between them. The length of second axial flange 222 is shorter than the length of first axial flange 241.

An elastic member 27, for example a rubber member, is disposed inward of the inner peripheral surface of first axial flange 241 to fill the gap between both axial flanges and to cover the axial end surface of radial flange 221 of hub 22. The elastic member 27 is fixed to first axial flange 241 and hub 22 by the vulcanization. Therefore, if coil 19 is not energized, armature plate 23 is pushed against the axial end surface of radial flange 221 or second axial flange 222 by the recoil strength of elastic member 27. This recoil strength of the elastic member is obtained by the following process. The elastic member 27 is first fixed to the first axial flange 241 and the hub 222 for connecting these two parts. The armature plate 23 is then fixed to the holder plate 24 by the plurality of rivets 25 for making the gap between the first axial flange 241 and the armature plate 23.

In this construction, if coil 19 is not energized, armature plate 23 is separated from pulley 15 by the recoil strength of elastic member 27 for maintaining the determined air gap. Therefore, only pulley 15 is driven by the engine of an automobile, and the compressor is not operated. On the other hand, when coil 19 is energized, armature plate 23 is attracted to pulley 15 by the magnetic flux which is caused by the energization of coil 19, and the elastic member 27 is bent in the axial direction. Therefore, the rotating movement of the automobile engine is transmitted to drive shaft 13 of the compressor through pulley 15, armature plate 23, holder plate 24, elastic member 27 and hub 22.

At the moment armature plate 23 contacts the axial end plate portion 153 of pulley 15, elastic member 27 receives the impact force caused by the torque of holder plate 24. However, the impact force is eased by the compressive deformation and twist deformation in the direction of the rotating movement of portions 27a of elastic member 27 which are enclosed by the straight lines of both axial flanges 222, 241. The impact force is also eased by the twist deformation in the direction of the rotating movement of portions 27b of elastic member 27 which are enclosed in the arc portions of both axial flanges 222, 241. The sudden torque change, which is transmitted to drive shaft 13, is thus eased by the deformation of elastic member 27.

The relative angular rotation between the first and second axial flanges 241 and 222 is limited by the compressive deformation of the portions 27a of elastic member 27. Therefore, the fatigue fracture of the elastic member 27, or the separation of the fixed portions of elastic member 27 from their connection to flanges 221, 222, 241, which could be caused by too large a twisting deformation of the elastic member 27, is prevented. Because of the gap 26 between armature plate 23 and the axial flange 241, heat radiation from armature plate 23 is improved to thereby reduce the heat fatigue of the elastic member 27. Moreover, the axial end surface of radial flange portion 221 of hub 22 is covered by elastic member 27. The diffusion of the noise or vibration, which is caused within the compressor during the operation and is transmitted outwardly through the drive shaft 13, is thereby minimized.

FIGS. 5 and 6 illustrate a modified structure of the embodiment shown in FIGS. 3 and 4. A plurality of holes 28 are formed through the elastic member 27 to form air passageways. Therefore, the amount of heat stored within the elastic member 27 is reduced and the heat radiation through the gap 26 is improved because air passes through holes 28. The holes 28 are located on the arc portions 27b of elastic member 27. Material in the portion of the elastic member which undergoes twist deformation is thereby reduced. The endurance of the clutch is thereby improved.

Figure 8:
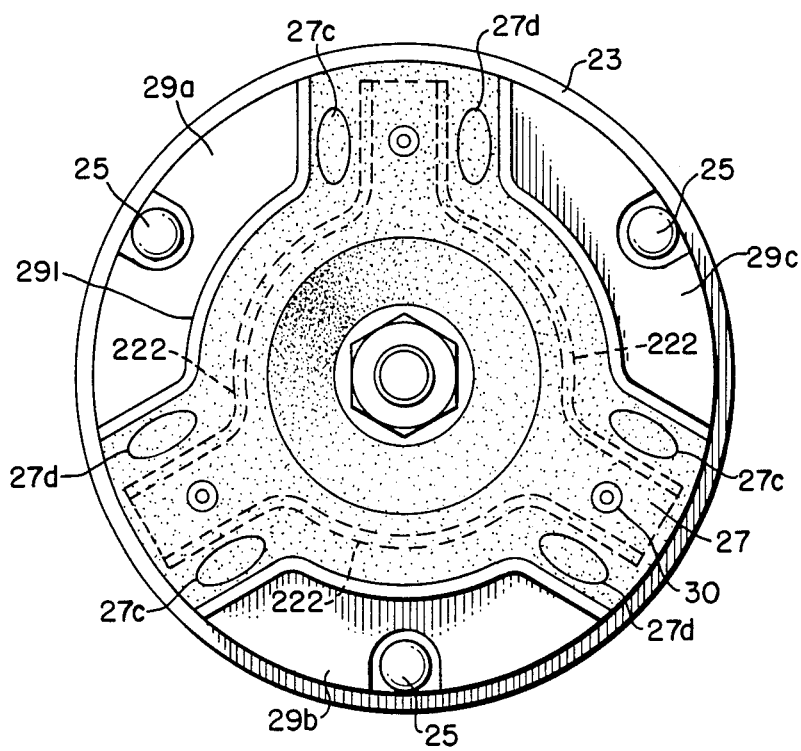
FIG. 8 is a front vivew of the electromagnetic clutch shown in FIG. 7.

Referring to FIGS. 7 and 8, another embodiment of a clutch in accordance with the present invention is shown. This embodiment is directed to a modification of the holder plate. In FIGS. 7 and 8, similar parts are represented by the same reference numerals as the embodiment shown in FIGS. 3 and 4.

Figure 9:
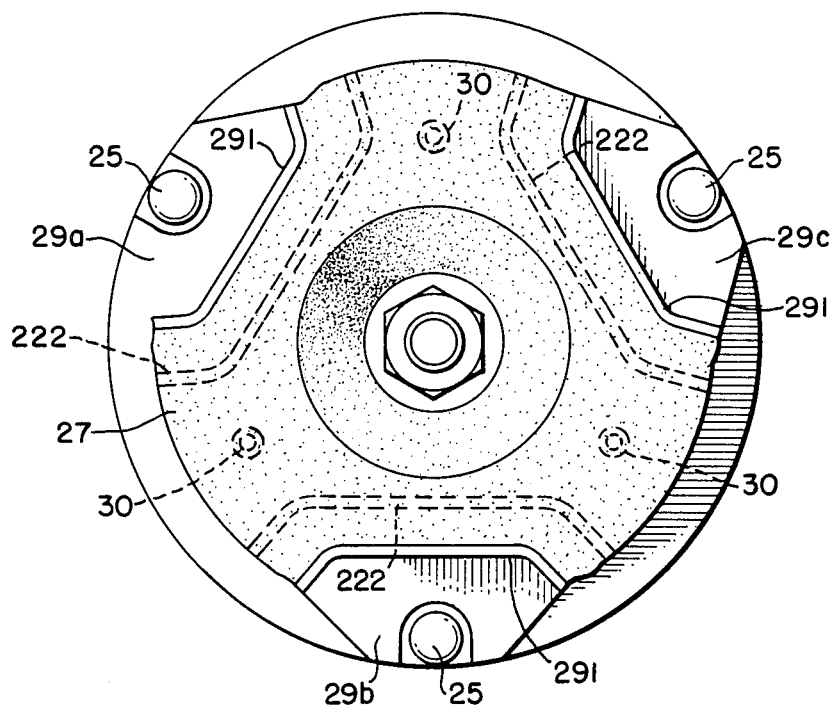
FIG. 9 is a front view of a modification of the embodiment of FIG. 8.

The holder plate 29 comprises a plurality of parts. As shown in FIG. 8 the holder plate comprises three parts 29a–29c. Each part 29a–29c has the same shape, and each part 29a–29c is fixed on the axial end surface of armature plate 23 by a rivet 25. Each holder plate 29a–29c is formed with a first axial flange 291 at inner portion thereof, which extends axially outward. Axial flange 291 has a pair of end portions joined by a center portion. Both end portions of axial flange 291 are formed as straight lines, which extend generally radially and the center portion of axial flange 291 has an arc-shaped form, as shown in FIG. 8. Alternatively, the arc-shaped center portion of flange 291 may be formed as a straight line, as shown in FIG. 9, in order to simplify construction. A gap 26 is made between the axial end surface of armature plate 23 and the axial end portion of first axial flange 291.

The radial flange portion 221 of hub 22 is formed with a second axial flange 222 at an outer end portion thereof. The second axial flange 222 extends axially outward. Each first axial flange 291 and second axial flange 222 of hub 22 are formed with similar or mating configurations and face one another with a gap between them. The length of second axial flange 222 is formed shorter than the length of first axial flange 291. An elastic member 27, for example, a rubber member, is disposed in the inner peripheral surface of first axial flange 291 to fill the gap between the axial flanges 291 and 222, and to cover the axial end surface of radial flange 221 of hub 22.

The armature plate 23 is attached to parts of the holder plate 29a–29c so that it is pressed toward the plate portion 153 of pulley 15 by a plurality of projections 30 formed on the axial end surface of radial flange 221 of hub 22, but with a gap between the plate portion 153 and the armature plate 23. The elastic member 27 is thereby placed under axial stress to obtain the recoil force for pushing armature plate 23 against the projection 30 of radial flange 221. The suitable predetermined air gap between the pulley 15 and armature plate 23 is thereby maintained.

In this construction, if coil 19 is not energized, armature plate 23 is separated from pulley 15 by the recoil force of elastic member 27. Only pulley 15 is driven by the engine of the automobile, and the compressor does not operate. On the other hand, when coil 19 is energized, armature plate 23 is attracted to pulley 15 by the magnetic flux, and the elastic member 27 is bent in the axial direction toward the pulley 15. Therefore, the rotating movement of the automobile engine is transmitted to drive shaft 13 of the compressor through pulley 15, armature plate 23, holder plate 29, elastic member 27 and hub 22.

When elastic member 27 receives the impact force through the torque of holder plate 29, the force is eased by the compressive deformation of portions 27c of elastic member 27 which are enclosed by one rotary end of the straight line portions of axial flanges 222, 291, and the tensile deformation of portions 27d of elastic member 27 which are enclosed by the other rotary end of straight line portions of axial flanges 222, 291. The sudden torque change of drive shaft 13 is thereby eased by the compressive and tensile deformation of elastic member 27.

The fatigue fracture of the elastic member or separation of the fixed portions of the elastic member is prevented by the compressive deformation of the elastic member, since the compressive deformation limits the relative angular rotation between the first and second axial flanges 222, 291. The heat fatigue of the elastic member 27 is reduced by the gap 26 between the armature plate 23 and first axial flange 291. Moreover, the diffusion of the noise or vibration of the compressor is minimized by the elastic member 27, as described above in reference to FIG. 3 and FIG. 4.

According to this invention, the impact force, which is transmitted to the shaft 13 of the compressor through the pulley 15, is eased principally by compressive deformation of the elastic member 27 which is connected between the armature plate 23 and the hub 22. Excessive twisting deformation of the elastic member 27 is prevented to thereby prevent the fatigue fracture or separation of the fixed portions of the elastic member 27. Excessive twisting is prevented by the compressive deformation of the elastic member between at least one pair of facing straight lines extending from spaced axial flanges.

Moreover, because of the gap between the armature plate 23 and the axial flange 291, heat radiation from the armature plate 23 is improved and the heat fatigue of the elastic member 27 is reduced.

The noise or vibration within the compressor, which diffuses externally of the compressor through the shaft 13, is minimized by the elastic member 27 which covers the radial flange 221 of hub 22 fixed on the shaft 13.

Furthermore, if the clutch is rotated in a direction opposite to the normal direction, the elastic member 27 functions in the same manner as it does in the normal direction of rotation. Therefore the clutch can be used as in both rotary directions.

This invention has been described in detail in connection with the preferred embodiments, but these are examples only and this invention is not restricted thereto. It will be easily understood by those skilled in the art that other variations and modifications can be easily made within the scope of the invention.

I claim:

1. In an electromagnetic clutch including a first rotatable member having an axial end plate of magnetic material, a second rotatable member to be connected to a driven member, an annular armature plate of magnetic material joined to the second rotatable member so as to be capable of limited axial movement, said annular armature plate facing said axial end plate of said first rotatable member with an axial air gap therebetween, and an electromagnetic means associated with said axial end plate for attracting said armature plate, whereby the rotation of said first rotatable member can be transmitted to said second rotatable member through said armature plate by the operation of said electromagnetic means, the improvement comprising a holder extending from said armature plate at its axial end surface opposite from its end surface which faces toward said axial end plate, said holder plate being formed with a first axially extending flange, said first axially extending flange having a configuration including at least one straight line, said second rotatable member being fixed on a hub having a radially extending flange portion, said radially extending flange portion having an inner and an outer axial end surface which extends radially between and connects said hub and a second axially extending flange portion, said inner axial end surface facing toward said axial end plate and said outer axial end surface facing away from said axial end plate, said first and second axially extending flange portions having similar configurations and facing one another with a radial gap between them, and an elastic member disposed in an inner peripheral surface of said first axial flange portion and extending therefrom to fill said radial gap between said first and second axially extending flange portions, to cover substantially the entire extent of said outer axial end surface located between said second axially extending flange portion and said hub and also to cover said second axially extending flange portion whereby the relative rotation between said first and second axially extending flanges is limited by the compression of said elastic member between the mating straight lines of said first and second axially extending flanges and the diffusion of vibration from the driven member is minimized.

2. An electromagnetic clutch of claim 1 wherein the length of said second axially extending flange portion is shorter than the length of said first axially extending flange portion.

3. An electromagnetic clutch of claim 1 wherein an axial gap is formed between said armature plate and said first axially flange portion.

4. An electromagnetic clutch of claim 1 wherein said elastic member is formed with at least one hole to communicate with said axial gap.

5. An electromagnetic clutch of claim 1 wherein said radial flange of said hub is formed with a plurality of axial projections for pushing axially against said armature plate.

6. An electromagnetic clutch of claim 1 wherein said first and second axially extending flange portions are formed in a generally triangular shape with each corner being generally arc-shaped.

7. An electromagnetic clutch of claim 1 wherein said holder plate is comprised of a plurality of similarly shaped parts.

8. An electromagnetic clutch of claim 7 wherein each of said first axially extending flange portions is formed of an arc-shaped portion and a straight line portion which is disposed on either side of said arc-shaped portion and extending generally radially.

9. An electromagnetic clutch of claim 8 wherein each of said first axially extending flange portions is formed of three generally straight lines, two of the straight line extending generally radially from opposite ends of the third straight line.

10. An electromagnetic clutch comprising:
a first rotatable member having an axial end plate of magnetic material;
a second rotatable member having a hub with a radial flange portion extending radially outward therefrom;
said radial flange portion having an inner axial end surface facing toward said axial end plate and an outer axial end surface facing away from said axial end plate;
an annular armature plate of magnetic material being concentrically disposed with respect to said hub with a radial air gap therebetween and facing said axial end plate of said first rotatable member with an axial gap therebetween;
electromagnetic means associated with said first rotatable member for attracting said armature plate to said axial end plate of said first rotatable member;
a holder plate extending from an axial end surface of said armature plate and being formed with a first axially extending flange portion, said first axially extending flange portion having a configuration including at least one straight line;
a second axially extending flange portion extending axially from said outer axial end surface of said radial flange portion at a radially outer end portion thereof and said first and second axially extending flange portions having similar configurations and facing one another with a radial gap between them; and
a elastic member disposed on an inner peripheral surface of said first axial flange portion and extending therefrom to fill said radial gap between said first and second axially extending flange portions and to cover substantially the entire extent of said outer axial end surface located between said second axially extending flange portion and said hub, and also to cover said second axially extending flange portion.

11. The electromagnetic clutch in accordance with claim 10 wherein the length of said second axially extending flange portion is shorter than the length of said first axially extending flange portion.

12. The electromagnetic clutch in accordance with claim 10 wherein an axial gap is formed between said armature plate and said first axially extending flange portion.

13. The electromagnetic clutch in accordance with claim 10 wherein at least one hole is formed in said elastic member for communication with said axial gap.

14. The electromagnetic clutch in accordance with claim 10 wherein said radial flange portion of said hub is formed with at least one axial projection for pushing axially against said armature plate.

15. The electromagnetic clutch in accordance with claim 10 wherein said first and second axially extending flange portions are formed in a generally triangular shape with each corner being generally arc-shaped.

16. The electromagnetic clutch in accordance with claim 10 wherein said holder plate is comprised of a plurality of similarly shaped parts.

17. The electromagnetic clutch in accordance with claim 16 wherein each of said first axially extending flange portions is formed of an arc-shaped portion and a straight line portion which is disposed on either side of said arc-shaped portion and extending generally radially.

18. The electromagnetic clutch in accordance with claim 16 wherein each of said first axially extending flange portions is formed of three generally straight lines, two of the straight lines extending generally radially from opposite ends of the third straight line.

* * * * *

UNITED STATES PATENT AND TRADEMARK OFFICE
CERTIFICATE OF CORRECTION

PATENT NO.　： 4,624,354

DATED　　　： November 25, 1986

INVENTOR(S)： Takatoshi Koitabashi

It is certified that error appears in the above-identified patent and that said Letters Patent is hereby corrected as shown below:

Column 4, line 41, "222" should be —22—.

Signed and Sealed this

Tenth Day of March, 1987

*Attest:*

DONALD J. QUIGG

*Attesting Officer*　　*Commissioner of Patents and Trademarks*